US012395304B2

(12) United States Patent
Huang et al.

(10) Patent No.: US 12,395,304 B2
(45) Date of Patent: Aug. 19, 2025

(54) INTERFERENCE RANK INDICATION BY A VICTIM NODE IN FULL DUPLEX

(71) Applicant: QUALCOMM Incorporated, San Diego, CA (US)

(72) Inventors: Min Huang, Beijing (CN); Yu Zhang, San Diego, CA (US); Chao Wei, Beijing (CN); Hao Xu, Beijing (CN); Qiaoyu Li, Beijing (CN); Chenxi Hao, Beijing (CN); Liangming Wu, Beijing (CN); Kangqi Liu, San Diego, CA (US); Jing Dai, Beijing (CN); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/997,776

(22) PCT Filed: Jun. 12, 2020

(86) PCT No.: PCT/CN2020/095901
§ 371 (c)(1),
(2) Date: Nov. 2, 2022

(87) PCT Pub. No.: WO2021/248475
PCT Pub. Date: Dec. 16, 2021

(65) Prior Publication Data
US 2023/0179380 A1 Jun. 8, 2023

(51) Int. Cl.
H04L 12/26 (2006.01)
H04B 7/0456 (2017.01)
(Continued)

(52) U.S. Cl.
CPC ......... *H04L 5/0057* (2013.01); *H04B 7/0486* (2013.01); *H04B 7/0626* (2013.01); *H04L 5/0091* (2013.01); *H04L 5/14* (2013.01)

(58) Field of Classification Search
CPC ....... H04L 5/0057; H04L 5/0091; H04L 5/14; H04L 5/0053; H04L 47/10; H04L 43/50;
(Continued)

(56) References Cited

U.S. PATENT DOCUMENTS 9,681,425 B2 * 6/2017 Geirhofer ............ H04B 7/0621
10,958,328 B2 * 3/2021 Chendamarai Kannan ................
H04B 7/0639
(Continued)

FOREIGN PATENT DOCUMENTS

| CN | 108111195 A | 6/2018 |
|----|-------------|--------|
| CN | 109156022 A | 1/2019 |
| EP | 3522390 A1 | 8/2019 |

OTHER PUBLICATIONS

CATT: "Views on Reciprocity Based CSI Acquisition", 3GPP TSG RAN WG1 NR-AdHoc#2, R1-1710062, Jun. 30, 2017 (Jun. 30, 2017), 3 Pages, the whole document.
(Continued)

Primary Examiner — Phuongchau Ba Nguyen
(74) Attorney, Agent, or Firm — Shumaker & Sieffert

(57) ABSTRACT

Aspects of the disclosure relate to a wireless user equipment (UE) configured to receive a downlink in a network configured for full duplex communication. The UE receives from the network an indication of a maximum rank of an uplink from an interfering, aggressor UE. The UE measures interference of a signal from the aggressor UE, and based on the measurement, determines one or more rank values for the aggressor UE, less than or equal to the maximum rank. The UE may further determine one or more channel parameters for downlink transmissions the UE receives, corresponding (Continued)

to the determined rank values. The UE then transmits a channel state information (CSI) report that includes an indication of at least one of the one or more rank values for the aggressor UE. The CSI report may further include the determined channel parameters. Other aspects, embodiments, and features are also claimed and described.

16 Claims, 9 Drawing Sheets

(51) Int. Cl.
*H04B 7/06* (2006.01)
*H04L 5/00* (2006.01)
*H04L 5/14* (2006.01)

(58) Field of Classification Search
CPC . H04L 12/2697; H04L 43/0852; H04L 43/00; H04B 7/0486; H04B 7/0626
See application file for complete search history.

(56) References Cited

U.S. PATENT DOCUMENTS

| | | | |
|---|---|---|---|
| 11,864,217 B2* | 1/2024 | Kim | H04L 5/0048 |
| 12,155,437 B2* | 11/2024 | Huang | H04W 24/10 |
| 2011/0136494 A1* | 6/2011 | Kim | H04W 72/27 |
| | | | 455/450 |
| 2018/0324856 A1 | 11/2018 | Zhang et al. | |
| 2020/0119890 A1 | 4/2020 | Yeh et al. | |
| 2021/0236736 A1* | 8/2021 | Murray | A61M 5/3134 |
| 2023/0247465 A1* | 8/2023 | Ibrahim | H04W 24/10 |
| | | | 370/252 |

OTHER PUBLICATIONS

International Search Report and Written Opinion—PCT/CN2020/ 095901—ISA/EPO—Feb. 25, 2021 9 Pages.

* cited by examiner

INTERFERENCE RANK INDICATION BY A VICTIM NODE IN FULL DUPLEX

This application is a national stage application under 35 U.S.C. § 371 of PCT Application No. PCT/CN2020/095901, filed Jun. 12, 2020. The entire content of PCT Application No. PCT/CN2020/095901 is incorporated herein by reference.

TECHNICAL FIELD

The technology discussed below relates generally to wireless communication systems, and more particularly, to interference handling in a wireless communication system configured for full duplex.

INTRODUCTION

In wireless communication systems, continuous and systematic improvements have dramatically increased a wireless link's capacity in the same wireless resources. For example, the combined data throughput for uplink (from a mobile device to a base station) and downlink (from a base station to a mobile device) communications over a wireless link is much higher than the past. However, research and development efforts continue to seek ways to further increase a wireless link's capacity.

For example, emerging wireless communication systems such as fifth-generation (5G) networks (including the New Radio (NR) specifications promulgated by 3GPP) have shown interest in the use of full duplex communication, where both endpoints of a wireless link can simultaneously communicate with one other using the same radio resources. Compared to time division duplex (TDD) and frequency division duplex (FDD) schemes, where any given wireless resource is generally dedicated for communication in only one direction, a full duplex feature can potentially double a wireless link's capacity. However, full realization of the potential of full duplex is complicated by interference. For example, an endpoint receiving a transmission over a full duplex link may suffer from self-interference caused by its own transmission to another endpoint over the same resources. Furthermore, an endpoint receiving a transmission over a full duplex link may suffer from co-channel interference caused by other endpoints transmitting their own signals over the same resources.

Physical isolation of transmission and reception antennas can help reduce such interference. And further, interference cancellation techniques have shown substantial improvements. Still, substantial interest is directed to improving interference handling for full duplex wireless communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to interference handling in a wireless communication network configured for full duplex. In particular, aspects of the disclosure relate to co-channel interference, also referred to as inter-user equipment (inter-UE) interference. A UE (victim UE) receiving a downlink in a full duplex network suffers from inter-UE interference from an aggressor UE transmitting an uplink over the same resources. The victim UE may receive from the network an indication of a maximum rank of an uplink from the aggressor UE. The victim UE may then measure one or more reference signals, such as sounding reference signals (SRS) transmitted by the aggressor UE. Based on this measurement the victim UE may determine one or more rank values for the aggressor UE, less than or equal to the maximum rank. The victim UE may further determine one or more channel parameters for downlink transmissions the victim UE receives, corresponding to respective ones of the determined rank values. The victim UE then transmits a channel state information (CSI) report that includes an indication of at least one of the determined rank values, and may further include the determined channel parameters. Accordingly, a base station can jointly determine a rank for the aggressor UE's uplink, and a transport format for the victim UE's downlink, in a way that can increase or maximize a combined downlink+uplink throughput for the victim and aggressor UEs.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
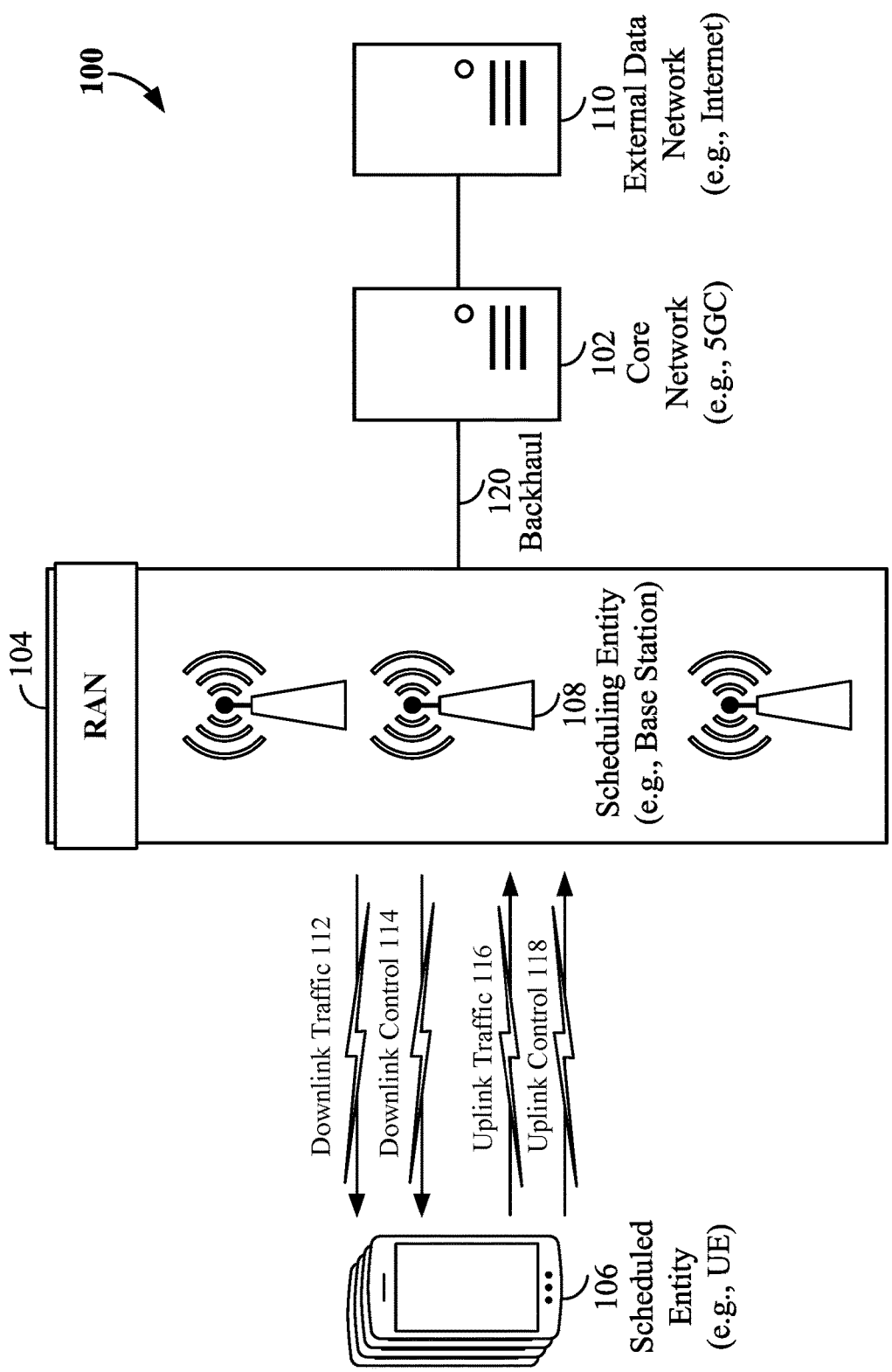
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

Some base stations 108 may be configured as integrated access and backhaul (IAB) nodes, where the wireless spectrum may be used both for access links (i.e., wireless links with UEs 106), and for backhaul links (e.g., links between base stations 108 and/or links to one or more core network nodes). This scheme is sometimes referred to as wireless self-backhauling. By using wireless self-backhauling, rather than requiring each new base station 108 deployment to be outfitted with its own hard-wired backhaul connection, the wireless spectrum utilized for communication between the base station 108 and UE 106 may be leveraged for backhaul communication, enabling fast and easy deployment of highly dense small cell networks. As described further below, some examples of IAB nodes may operate as base stations 108, and some examples of IAB nodes may operate as relay nodes extending the range of a cell. Further, some examples of IAB nodes may be configured for full-duplex, communicating over the same time-frequency resources for both transmitting and receiving wireless signals.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
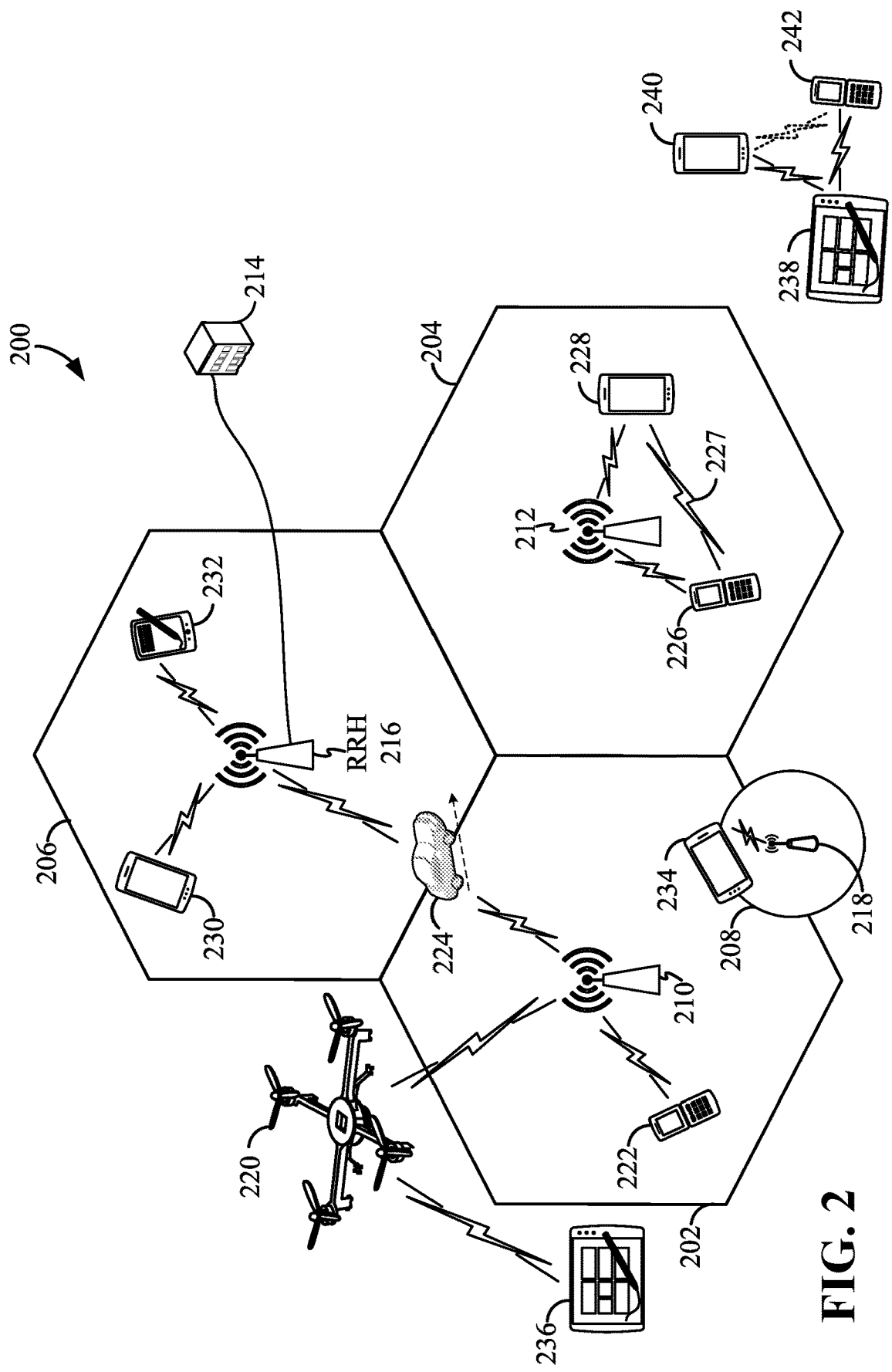
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Figure 3:
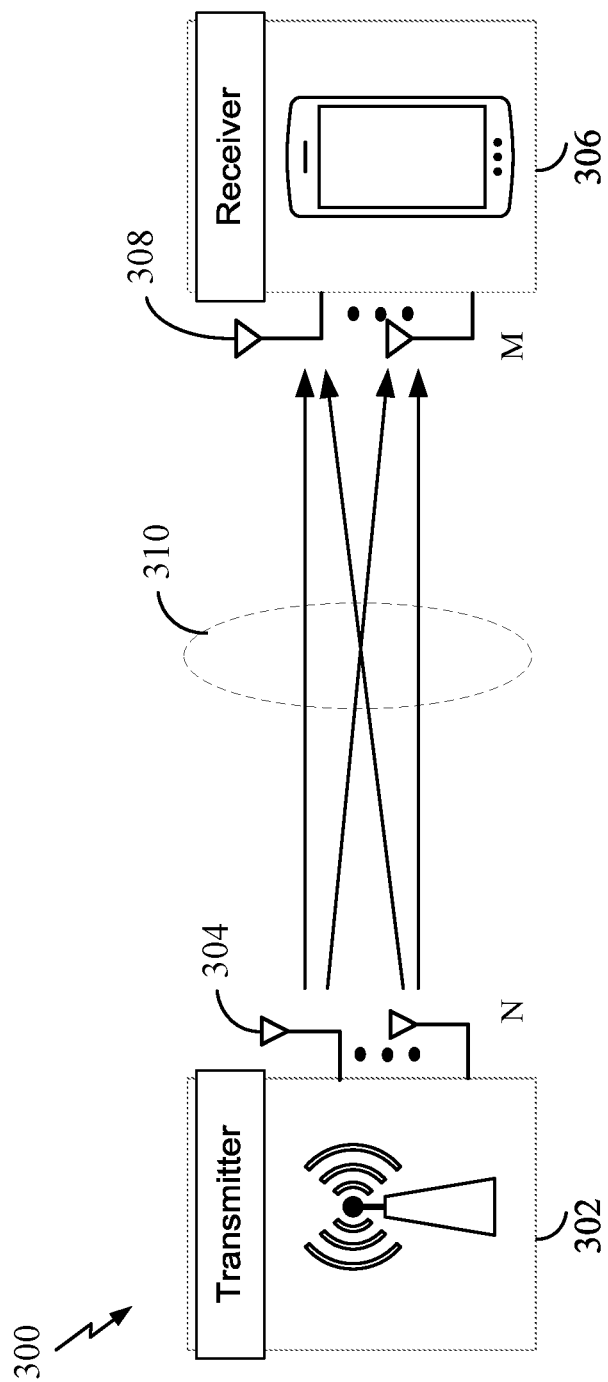
FIG. 3 is a block diagram illustrating a wireless communication system supporting multiple-input multiple-output (MIMO) communication.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, the amplitude and phase of each antenna in an array of antennas may be precoded, or controlled to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, transmitter may send multiple data streams to a single receiver. In this way, a MIMO system takes advantage of capacity gains and/or increased data rates associated with using multiple antennas in rich scattering environments where channel variations can be tracked. Here, the receiver may track these channel variations and provide corresponding feedback to the transmitter. In the simplest case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. The receiver may transmit feedback including a quantized version of the channel so that the transmitter can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiving device, as well as other considerations, such as the available resources at the transmitting device, may also affect the transmission rank. For example, a base station in a cellular RAN may assign a rank (and therefore, a number of data streams) for a DL transmission to a particular UE based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI along with resource information (e.g., the available resources and amount of data to be scheduled for the UE) to assign a DL transmission rank to the UE.

The transmitting device 302 determines the precoding of the transmitted data stream or streams based, e.g., on known channel state information of the channel on which the transmitting device transmits the data stream(s). For example, the transmitting device 302 may transmit one or more suitable reference signals (e.g., a channel state information reference signal, or CSI-RS) that the receiving device 306 may measure. The receiver 306 may then report measured channel quality information (CQI) back to the transmitting device 302. This CQI generally reports the current communication channel quality, and in some examples, a requested transport block size (TBS) for future transmissions to the receiver 306. In some examples, the receiver 306 may further report a precoding matrix indicator (PMI) back to the transmitting device 302. This PMI generally reports the receiving device's preferred precoding matrix for the transmitting device 302 to use, and may be indexed to a predefined codebook. The transmitting device 302 may then utilize this CQI/PMI to determine a suitable precoding matrix for transmissions to the receiver 306.

In Time Division Duplex (TDD) systems, the UL and DL are reciprocal, in that each uses different time slots of the same frequency bandwidth. Therefore, in TDD systems, a transmitting device 302 such as a base station may assign a rank for DL MIMO transmissions based on an UL SINR measurement (e.g., based on a sounding reference signal (SRS) or other pilot signal transmitted from the receiving device 306, such as a UE). Based on the assigned rank, the base station may then transmit a channel state information reference signal (CSI-RS) with separate sequences for each layer to provide for multi-layer channel estimation. From the CSI-RS, the UE may measure the channel quality across layers and resource blocks. The UE may then transmit a CSI report (including, e.g., CQI, RI, and PMI) to the base station for use in updating the rank and assigning resources for future downlink transmissions.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may correspond to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given layer. That is, in a MIMO implementation with multiple layers available for different data streams, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the subcarrier spacing used. In some examples, depending on the subcarrier spacing, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates an example slot structure of the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
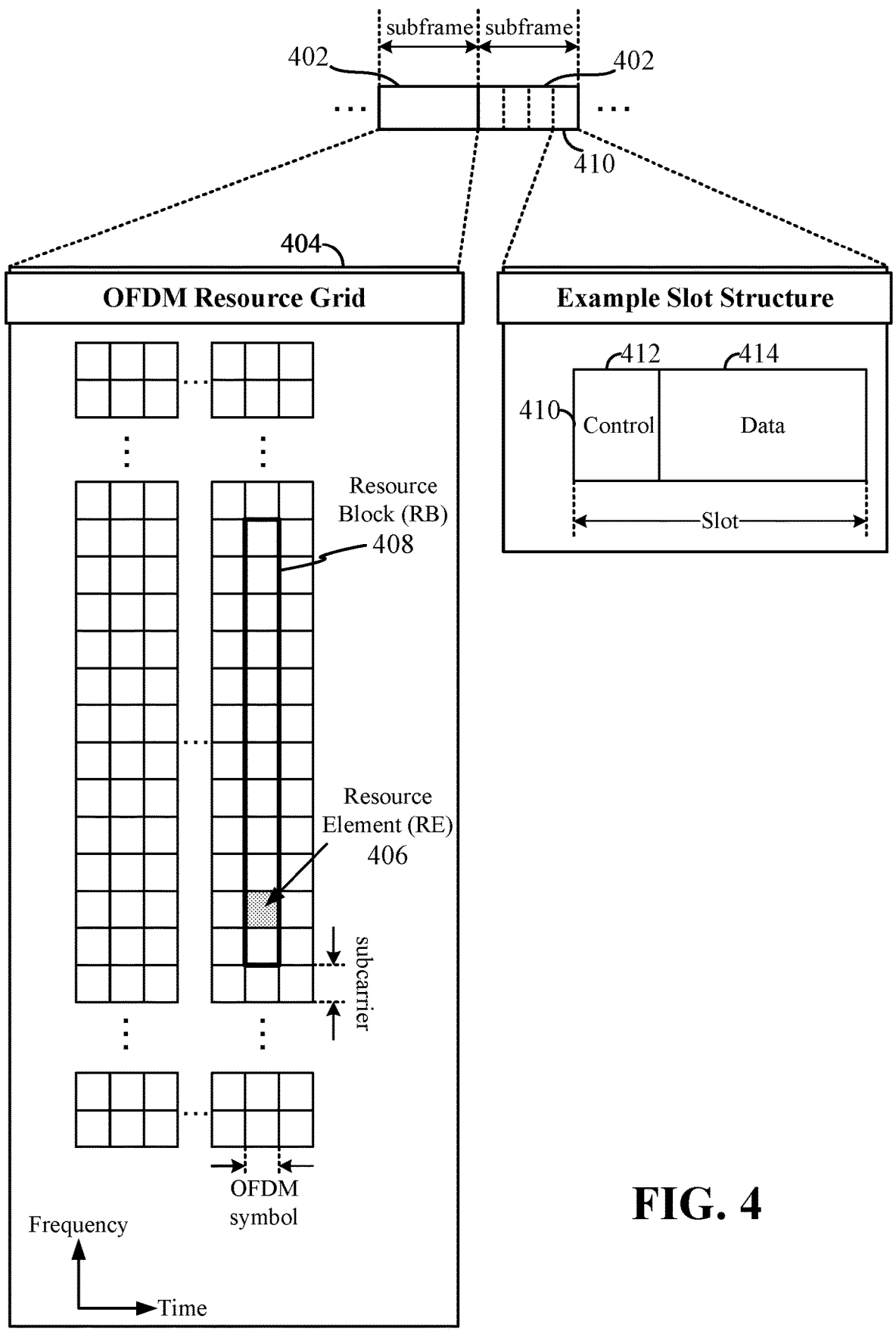
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A synchronization signal block (SSB) includes primary and secondary synchronization signals PSS and SSS (collectively referred to as SS), and in some examples, a PBCH. A scheduling entity 108 may transmit an SSB in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SSB, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), a channel state information (CSI) report, or any other suitable UL control information. A CSI report may include any suitable channel state information, such as a channel quality indicator (CQI), a precoding matrix indicator (PMI), and a rank indicator (RI). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, a scheduling entity 108 may allocate one or more REs 406 (e.g., within the data region 414) for user data or traffic data. One or more traffic channels can carry such traffic, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI) and other system information (OSI). The RAN may periodically broadcast the MSI over the cell to provide the most basic information required for initial cell access, and for acquiring any OSI that may be broadcast periodically or sent on-demand. In some examples, the RAN may provide the MSI over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer, with a designated transport format. Transport channels carry blocks of information called transport blocks (TB). Each TB has an associated transport format that specifies how the TB is transmitted over the wireless carrier. The transport format may include information about one or more of a TB size (TBS), a modulation and coding scheme (MCS), antenna mapping, transmission beam selection, MIMO schemes, etc. A TBS may correspond to a number of bits of information. The TBS may be a controlled parameter, based on the MCS and the number of RBs in a given transmission.

The air interface in the radio access network 200 may utilize one or more duplexing algorithms. Duplex refers to a point-to-point communication link where both endpoints can communicate with one another in both directions. Full duplex means both endpoints can simultaneously communicate with one another using the same radio resources. Half duplex means only one endpoint can send information to the other at a time. In a wireless link, a full duplex carrier generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given carrier are separated from one another using time division multiplexing. That is, at some times the carrier is dedicated for transmissions in one direction, while at other times the carrier is dedicated for transmissions in the other direction, where the direction may change very rapidly, e.g., several times per slot.

Figure 5:
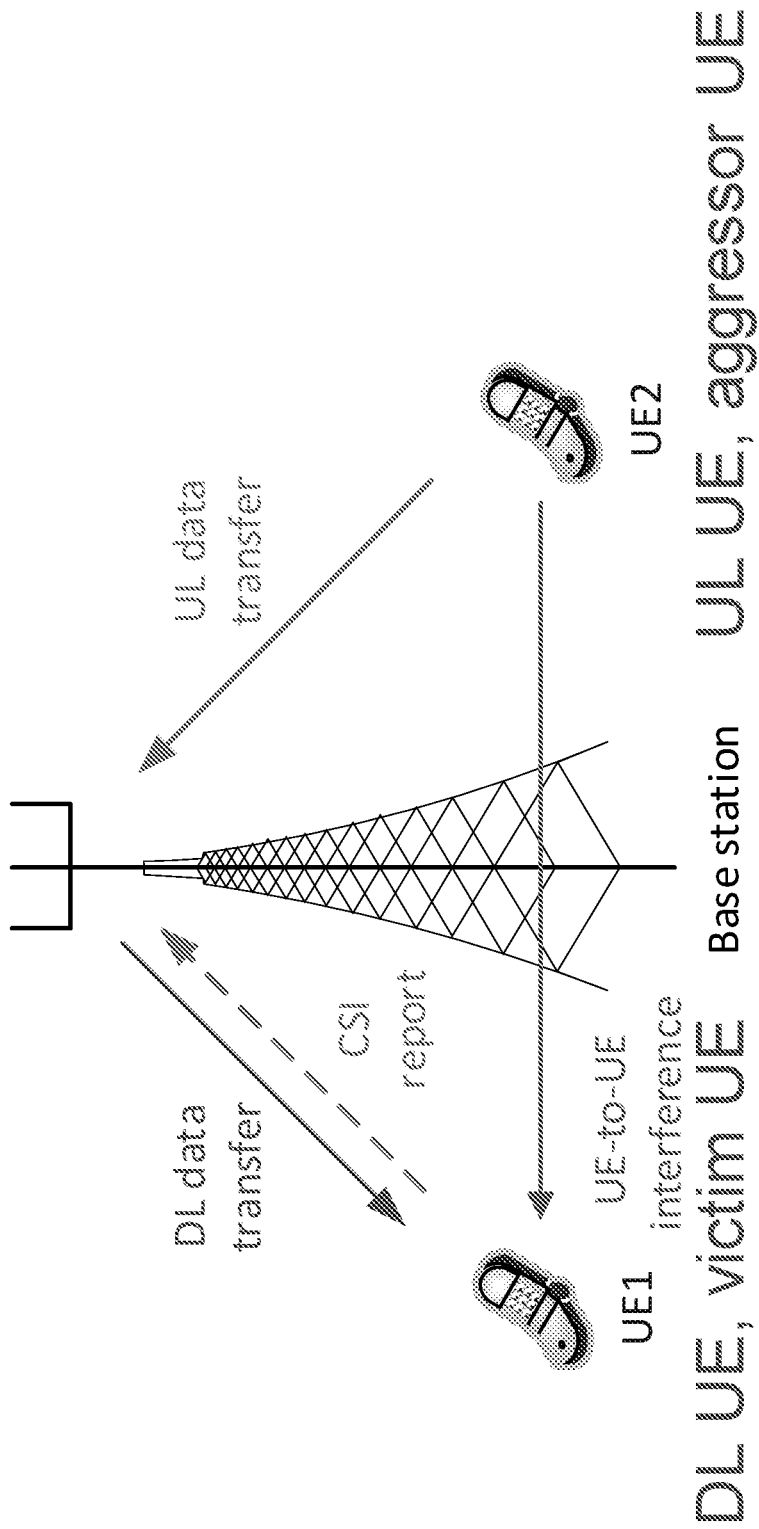
FIG. 5 is a conceptual illustration of an example of a base station configured for full duplex, communicating in a downlink with a first device and in an uplink with a second device, utilizing the same wireless resources.

In theory, by reusing resources for both UL and DL communication, full duplex communication techniques can double a link's capacity in comparison to half duplex communication techniques. For example, a full duplex network node, such as a base station in a cellular network, can simultaneously communicate in uplink (UL) and downlink (DL) directions with two half duplex terminals using the same radio resources. FIG. 5 illustrates an example of a full duplex enabled base station communicating with two UEs labeled UE1 and UE2. As illustrated, the base station transfers DL data to UE1 at the same time, and over the same resources, as UE2 transfers UL data to the base station. When using this scheme, the UE that transmits the UL signal (UE2) generates inter-UE interference for the UE that receives the DL signal (UE1). And further, the base station generates self-interference, as its DL transmission interferes with its own reception of the UL transmission from UE2.

In another example, a full duplex relay node such as an integrated access and backhaul (IAB) node can act as a relay, extending the range of a cell. That is, by using a relay node, an IAB donor (which can be a base station, e.g., a gNB, or may be another IAB relay node) can transmit data to a UE over an extended range, being relayed by the relay node. And further, an IAB donor can receive data from a UE over an extended range, being relayed by the relay node.

Figure 6A:
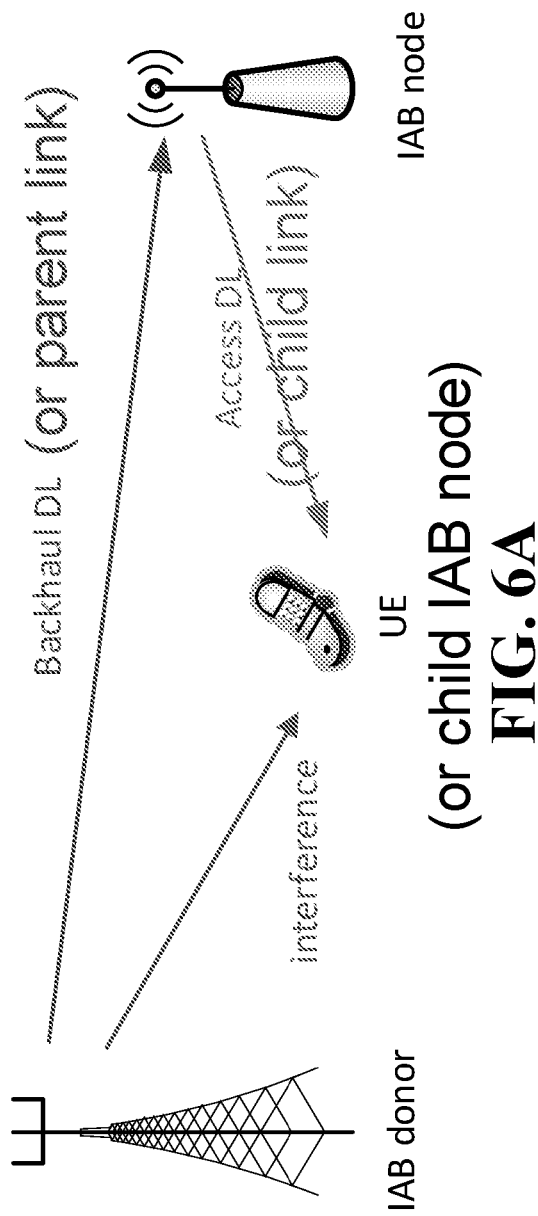
FIGS. 6A-6B provide a conceptual illustration of operation of an integrated access and backhaul (IAB) relay node in a network configured for full duplex.
Figure 6B:
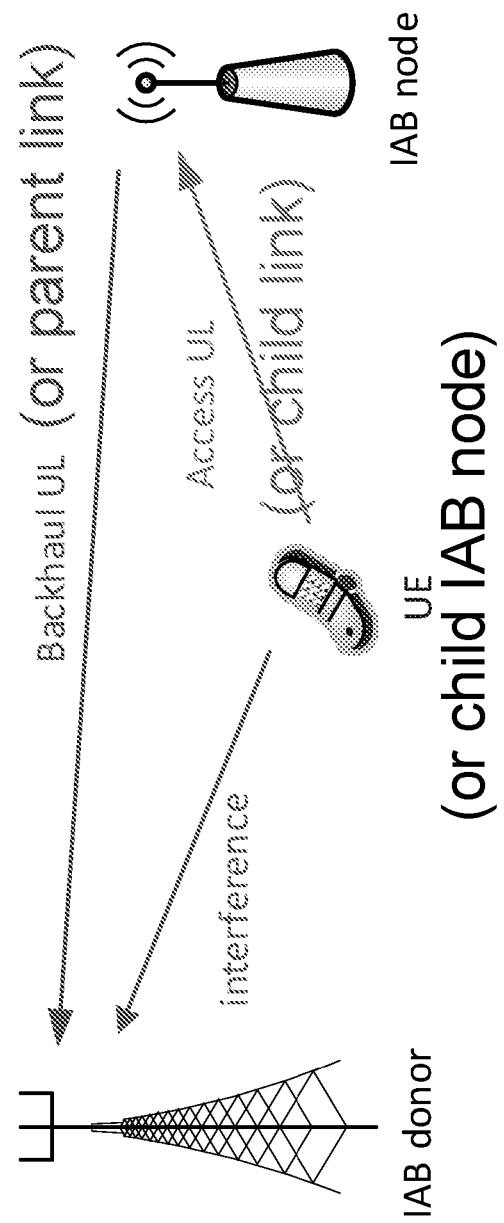

FIGS. 6A and 6B illustrate one such system including at least one full duplex IAB relay node. FIG. 6A illustrates signaling in DL communication, and FIG. 6B illustrates signaling in UL communication. In FIGS. 6A and 6B, an IAB donor is a full duplex node, which may correspond either to a base station (e.g., a gNB) or an IAB relay node. And the IAB node is a full duplex IAB relay node. In a one-hop scenario, the full duplex IAB node simultaneously communicates with an anchor node (the illustrated IAB donor, e.g., a base station) over its backhaul link, and with a UE over its access link. And in a multi-hop scenario, the full duplex IAB node simultaneously communicates with a parent node (the illustrated IAB donor, e.g., a base station or IAB relay node) over its backhaul link, and with a child node (e.g., a UE or IAB relay node) over its access link.

Similar to the example in FIG. 5, in the example of FIG. 6A, interference from the IAB node's backhaul link or parent link (i.e., a DL transmission from the IAB donor to the IAB node) causes data reception performance deterioration at the UE receiving the IAB node's access link or child link (i.e., a DL transmission from the IAB node to the UE). And in FIG. 6B, interference from the IAB node's access link or child link (i.e., an UL transmission from the UE to the IAB node) causes data reception performance deterioration at the IAB donor receiving the IAB node's backhaul link or parent link (i.e., an UL transmission from the IAB node to the IAB donor).

In the description that follows, in relation to a discussion of inter-UE interference, it is to be understood that reference to a DL UE refers generally to a node, be it a UE or an IAB node, receiving a DL transmission. For example, in relation to FIG. 5, reference to a DL UE may refer to UE1, receiving a DL transmission directly from a base station. In relation to FIG. 6A, reference to a DL UE may refer equivalently to a UE or a child IAB node, receiving a DL transmission from an IAB node over the IAB node's access link. Furthermore, in relation to FIG. 5, reference to an UL UE may refer to UE2, transmitting a UL transmission directly to a base station. In relation to FIG. 6B, reference to an UL UE may refer equivalently to a UE transmitting an UL transmission directly to a base station, and to a parent IAB node transmitting an UL transmission from a child IAB node to a base station or other IAB donor over the IAB backhaul link.

Reference to the respective UEs (including IAB nodes as described in the previous paragraph) as a DL UE and an UL UE is used in the present disclosure to simplify discussion of the inter-UE interference caused by the UL UE upon the DL UE in a full duplex system. Further, when discussing such inter-UE interference in this disclosure, a UL UE may equivalently be referred to as an aggressor UE, and a DL UE may equivalently be referred to as a victim UE. In other words, reference to a DL UE includes a UE receiving a DL transmission from a base station; a UE receiving a DL transmission over an access link from an IAB relay node; an IAB relay node receiving a DL transmission from a base station over the IAB relay node's backhaul link; and a child IAB node receiving a DL transmission from a parent IAB node over the child IAB node's parent link. And reference to an UL UE includes a UE transmitting an UL transmission to a base station; a UE transmitting an UL transmission over an access link to an IAB relay node; a child IAB node transmitting an UL transmission over a child link to a parent IAB node; and a parent IAB node transmitting an UL transmission over a backhaul link to an IAB donor.

In the present disclosure, one or both of the DL UE and/or the UL UE may be configured for half duplex or full duplex. Accordingly, a DL UE may be simultaneously transmitting an UL; and the UL UE may be simultaneously receiving a DL. However, for ease of discussion, only the DL reception of the DL UE will be discussed; and only the UL transmission of the UL UE will be discussed.

As discussed above, in a cell activating full duplex a DL UE generally suffers from co-channel interference, or inter-UE interference, from a paired UL UE (i.e., a UE transmitting a UL transmission on the same full duplex carrier). Here, a DL UE and UL UE are considered to be paired with one another if the UL UE transmits its UL at the same time, and on at least a portion of the same resources on which the DL UE receives its DL or on a resource so close to the resource on which the DL UE receives its DL that the transmission of the UL signal can impact the reception of DL signal. The strength of this inter-UE interference depends on the distance between the aggressor (UL) and victim (DL) UEs. The interference further depends on the aggressor UE's UL Tx beamforming, if used. And, if the victim UE has more than one receive antenna and performs coherent antenna reception, the interference strength also depends on the spatial direction of the interference signal. Accordingly, a victim UE, and not a base station, can have a capability to directly characterize interference from an aggressor UE to the victim UE.

To address inter-UE interference between cells, NR Rel-16 specifications introduce a feature called cross-link interference (CLI) handling. CLI handling provides an approach for a UE in one cell to measure interference from UEs in other cells. For example, a network may configure a set of SRS resources for both DL UEs and the UL UEs. Here, the respective SRS configurations can be coordinated between the aggressor and victim cells via a backhaul connection between the respective base stations. Accordingly, the network configures DL UEs to measure the strength of SRS signals from UL UEs in neighboring cells.

With this scheme for CLI handling, two paired UEs are located in two different cells. Accordingly, to coordinate the SRS resource configuration across UEs in different cells and enable such inter-cell SRS measurements, the cells' base stations communicate with one another through a backhaul connection. Considering backhaul data rate and latency restrictions, with this CLI handling scheme, in existing specifications for NR a victim UE can only report a layer-3 measurement result to an aggressor cell, i.e. the values of an SRS reference signal received power (SRS-RSRP) or a CLI received signal strength indicator (CLI-RSSI). Here, the victim UE generates these layer-3 measurement results based on the results of long-term measurements (e.g., over a duration of tens or even hundreds of slots). And furthermore, due to backhaul transfer latency restrictions, in existing specifications for NR the information transfer between victim and aggressor cells in CLI handling can only take a static or semi-static mode. Correspondingly, the network can only configure a victim UE's SRS measurement in a static or semi-static pattern. Therefore, the above-described CLI handling techniques may be suitable for long-term interference management, e.g., where a network allocates non-overlapping radio resources to an aggressor UE and a victim UE.

However, an improved inter-UE interference handling technique, such as provided in the present disclosure, can increase the system capacity relative to these CLI handling techniques by enabling radio resource reuse in a full duplex scheme. By thereby essentially doubling each single-link capacity, full duplexing with the presently disclosed inter-UE interference handling can increase the system throughput in diverse applications in wireless communication networks, and also reduce the transfer latency for time critical services.

In some previously disclosed examples, a base station may transmit an instruction to a DL UE (i.e., a victim UE) in full duplex mode to measure inter-UE interference based on SRS reception from an UL UE (i.e., an aggressor UE). The victim UE may then add an SRS resource indicator (SRI) in a CSI report it transmits to the BS, to indicate the selection of a matched UL UE (aggressor UE) and its beam. In this way, the base station can suitably schedule the DL UE (victim UE) and the UL UE (aggressor UE), and determine their respective transport formats (e.g., transmission beams, MIMO schemes, MCS values, etc.).

In another example, a base station may transmit an instruction to a DL UE (i.e., a victim UE) in full duplex mode to inform the victim UE of SRS resource usage by an UL UE (i.e., an aggressor UE), and the number of layers in the interfering UL transmission from the aggressor UE. Here, the victim UE may then transmit a CSI report to the base station based on the aggressor UE's SRS transmission and the received number of inter-UE interference layers. With this scheme, in an example where the aggressor UE has a higher priority than the victim UE, the base station may determine the UL (aggressor) UE's transport format prior to determining the DL (victim) UE's transport format.

However, according to an aspect of the present disclosure, when the victim UE and the aggressor UE have equal priority, a base station may jointly determine transport formats of the victim and aggressor UE. In this way, a network can further enhance the system throughput compared to one such as the example previously described, where a base station separately determines the respective UEs' transport formats. That is, the transport format of a DL transmission to a victim UE impacts not only the DL channel gain, but also impacts the self-interference strength (i.e., the interference of the DL on the BS's UL reception). And on the other hand, the transport format of an UL transmission from an aggressor UE impacts not only the UL channel gain, but also impacts the inter-UE interference strength (i.e., the interference of an aggressor UE's UL transmission on a victim UE's DL reception). Thus, a joint determination of both transport formats can provide for an improved consideration of a trade-off between the DL and UL in full duplex.

As discussed in the above examples, a victim UE, and not a base station, may have a capability to directly characterize interference from an aggressor UE to the victim UE. Therefore, in some aspects of this disclosure, the victim UE may determine and indicate to the base station a preferred value of the inter-UE interference rank. With this information from the victim UE, a base station may jointly determine transport formats of a paired UL UE and DL UE in full duplex.

In some examples, a victim UE may additionally report a set of preferred PMI values to a base station. This PMI can indicate a victim UE-preferred beamforming weight for the aggressor UE's UL transmission, which can match the transport format of the victim UE's DL reception. However, the number of bits needed to represent the set of PMI values is large. Accordingly, transmission of this information from a victim UE may be unsuitable in a scenario where the UL capacity or coverage is limited. In comparison, the number of bits needed to represent the value of the interference rank is quite small. Thus, victim UE transmission of an inter-UE interference rank can be suitable even in scenarios with a poor UL channel and heavy load.

Therefore, according to various aspects of the present disclosure, a DL UE (i.e., a victim UE) may characterize interference it experiences from an UL UE (i.e., an aggressor UE). For example, the victim UE may characterize interference by receiving an SRS from the aggressor UE. The victim UE may then determine an inter-UE interference rank (i.e. a number of layers of the aggressor UE's interfering UL transmission) based on the received SRS. Here, the inter-UE interference rank corresponds to the rank of an UL data channel of the aggressor UE in full duplex. The victim UE may then determine suitable parameters for a CSI report, corresponding to the determined inter-UE interference rank. That is, the victim UE may determine, e.g., a CQI, RI, and PMI for a DL transmission from the base station to the victim UE, such that the DL transmission and the inter-UE interfering transmission of the selected rank can be optimized in terms of total throughput of the UL and DL UEs, in terms of throughput of one or the other UE, or any other suitable relationship. The victim UE may then transmit the determined inter-UE interference rank, and the corresponding CSI, to a base station.

In a further aspect of the present disclosure, a victim UE may determine more than one inter-UE interference rank for a given aggressor UE. For example, the victim UE may step through each possible rank up to an indicated maximum rank, and determine a corresponding CSI value for each of the ranks. The victim UE may then transmit to a base station respective CSI report values (e.g., RI, CQI, and/or PMI) for each determined inter-UE interference rank. This adds flexibility for a base station, in that the base station may select one of those combinations of interference rank/CSI by jointly considering the performance of the aggressor UE along with the interference to the victim UE.

Figure 7:
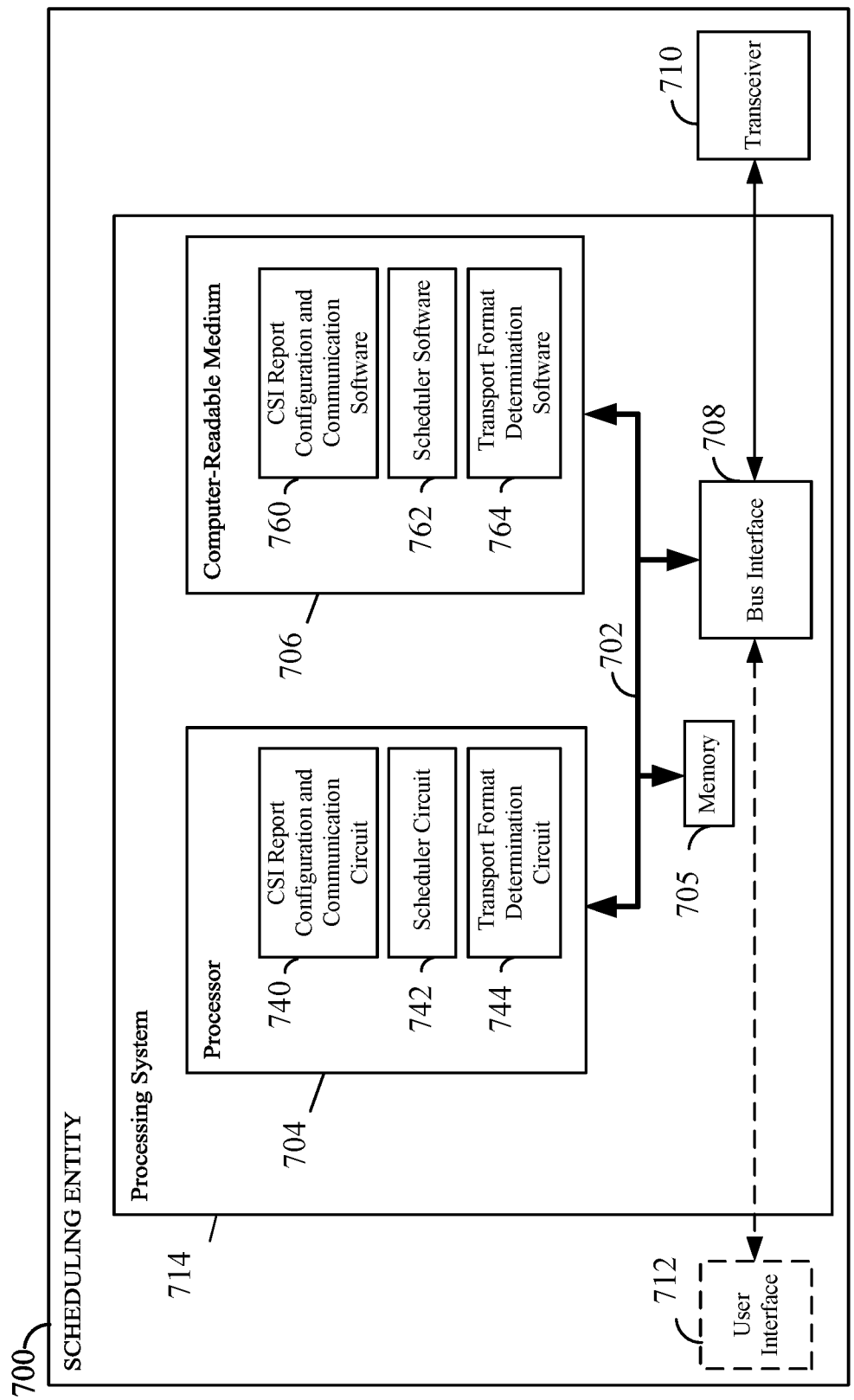
FIG. 7 is a block diagram conceptually illustrating an example of a hardware implementation for a scheduling entity according to some aspects of the disclosure.

FIG. 7 is a block diagram illustrating an example of a hardware implementation for a scheduling entity 700 employing a processing system 714. For example, the scheduling entity 700 may be a user equipment (UE) as illustrated in any one or more of FIGS. 1, 2, 3, 5, and/or 6. In another example, the scheduling entity 700 may be a base station as illustrated in any one or more of FIGS. 1, 2, 3, 5, and/or 6. And in some examples, the scheduling entity 700 may be an IAB node as illustrated in any one or more of FIGS. 5 and/or 6.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes and procedures described below and illustrated in FIG. 9.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 may include CSI report configuration and communication circuitry 740 configured for various functions, including, e.g., determining a maximum rank of an aggressor UE, transmitting a CSI report including an indication of a maximum rank of an aggressor UE, and/or receiving a CSI report including an indication of a rank for an aggressor UE. In some examples, the CSI report configuration and communication circuitry 740 may further receive a CSI report including a set of one or more channel parameters corresponding to the received rank for the aggressor UE. For example, the CSI report configuration and communication circuitry 740 may be configured to implement one or more of the functions described below in relation to FIG. 9, including, e.g., block 902 and/or 908. The processor 704 may further include scheduler circuitry 742 configured for various functions, including, e.g., determining an UL resource allocation for an aggressor UE and/or determining a DL resource allocation for a victim UE. For example, the scheduler circuitry 742 may be configured to implement one or more of the functions described below in relation to FIG. 9, including, e.g., blocks 910, 912, and/or 914. The processor 704 may further include transport format determination circuitry 744 configured for various functions, including, e.g., determining a rank for an UL resource assignment for an aggressor UE based on a rank value received from a victim UE, and/or determining a transport format for a DL resource assignment for a victim UE based on a set of channel parameters (e.g., CSI report) received from the victim UE. For example, the transport format determination circuitry 744 may be configured to implement one or more of the functions described below in relation to FIG. 9, including, e.g., blocks 910, 912, and/or 914.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include CSI report configuration and communication software 760 configured for various functions, including, e.g., determining a maximum rank of an aggressor UE, transmitting a CSI report including an indication of a maximum rank of an aggressor UE, and/or receiving a CSI report including an indication of a rank for an aggressor UE. In some examples, the CSI report configuration and communication software 760 may further receive a CSI report including a set of one or more channel parameters corresponding to the received rank for the aggressor UE. For example, the CSI report configuration and communication software 760 may be configured to implement one or more of the functions described below in relation to FIG. 9, including, e.g., blocks 902 and/or 908. The computer-readable storage medium 706 may further include scheduler software 742 configured for various functions, including, e.g., determining an UL resource allocation for an aggressor UE and/or determining a DL resource allocation for a victim UE. For example, the scheduler software 742 may be configured to implement one or more of the functions described below in relation to FIG. 9, including, e.g., blocks 910, 912, and/or 914. The computer-readable storage medium 706 may further include transport format determination software 764 configured for various functions, including, e.g., determining a rank for an UL resource assignment for an aggressor UE based on a rank value received from a victim UE, and/or determining a transport format for a DL resource assignment for a victim UE based on a set of channel parameters (e.g., CSI report) received from the victim UE. For example, the transport format determination software 764 may be configured to implement one or more of the functions described below in relation to FIG. 9, including, e.g., blocks 910, 912, and/or 914.

In one configuration, the scheduled entity or UE 700 configured for wireless communication includes means for receiving channel state information (CSI) report configuration information, including an indication of a maximum rank of an aggressor UE's uplink transmission; means for performing an interference measurement of a signal received from the aggressor UE; means for determining one or more rank values for the aggressor UE, less than or equal to the maximum rank, based on the interference measurement; and means for transmitting a CSI report comprising an indication of at least one rank value of the one or more rank values for the aggressor UE. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Figure 9:
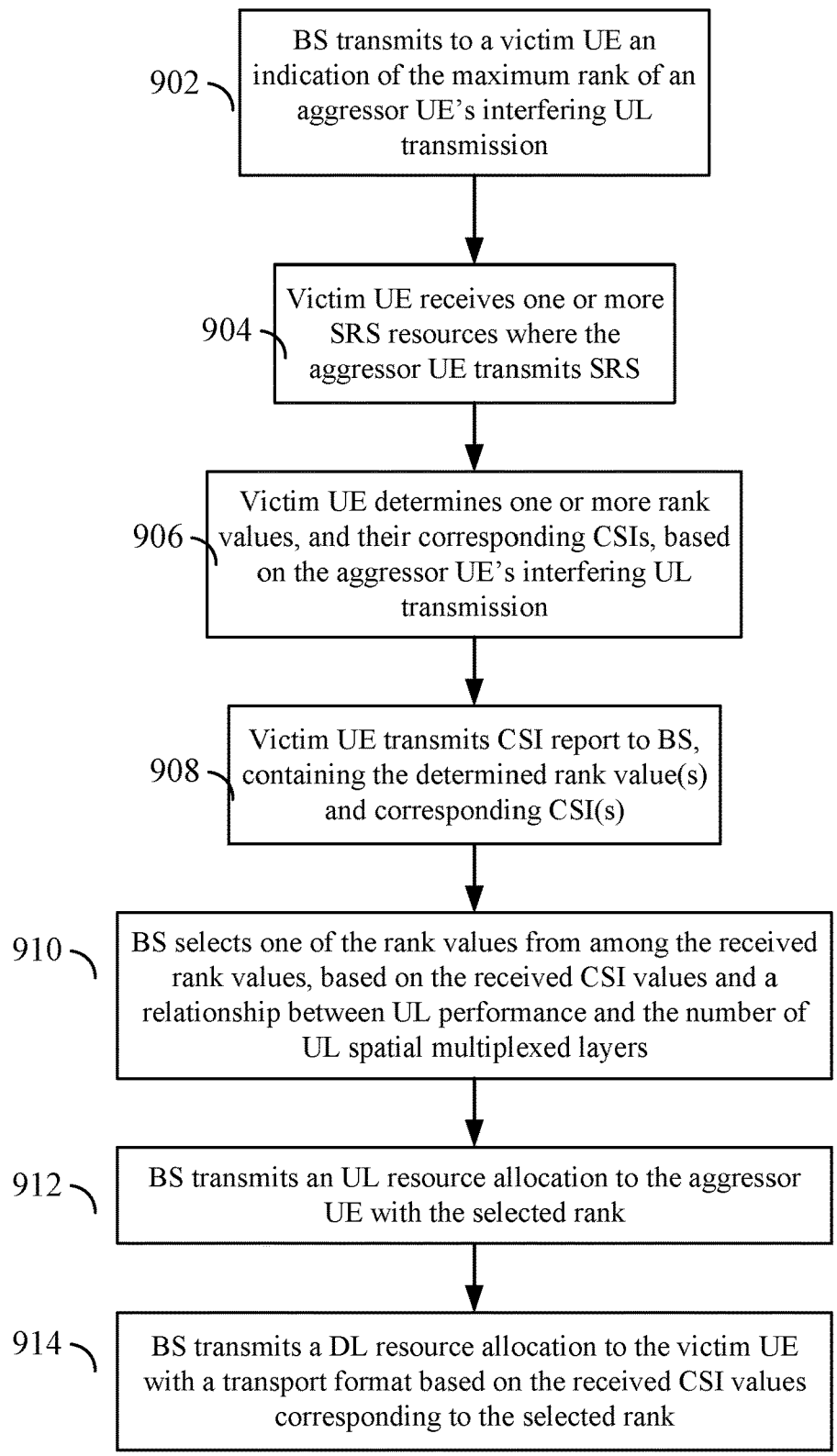
FIG. 9 is a flow chart illustrating an exemplary process for interference handling in a wireless communication network configured for full duplex, according to some aspects of the disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 3, 5, 6, and/or 7, and utilizing, for example, the processes and/or algorithms described herein in relation to FIG. 9.

Figure 8:
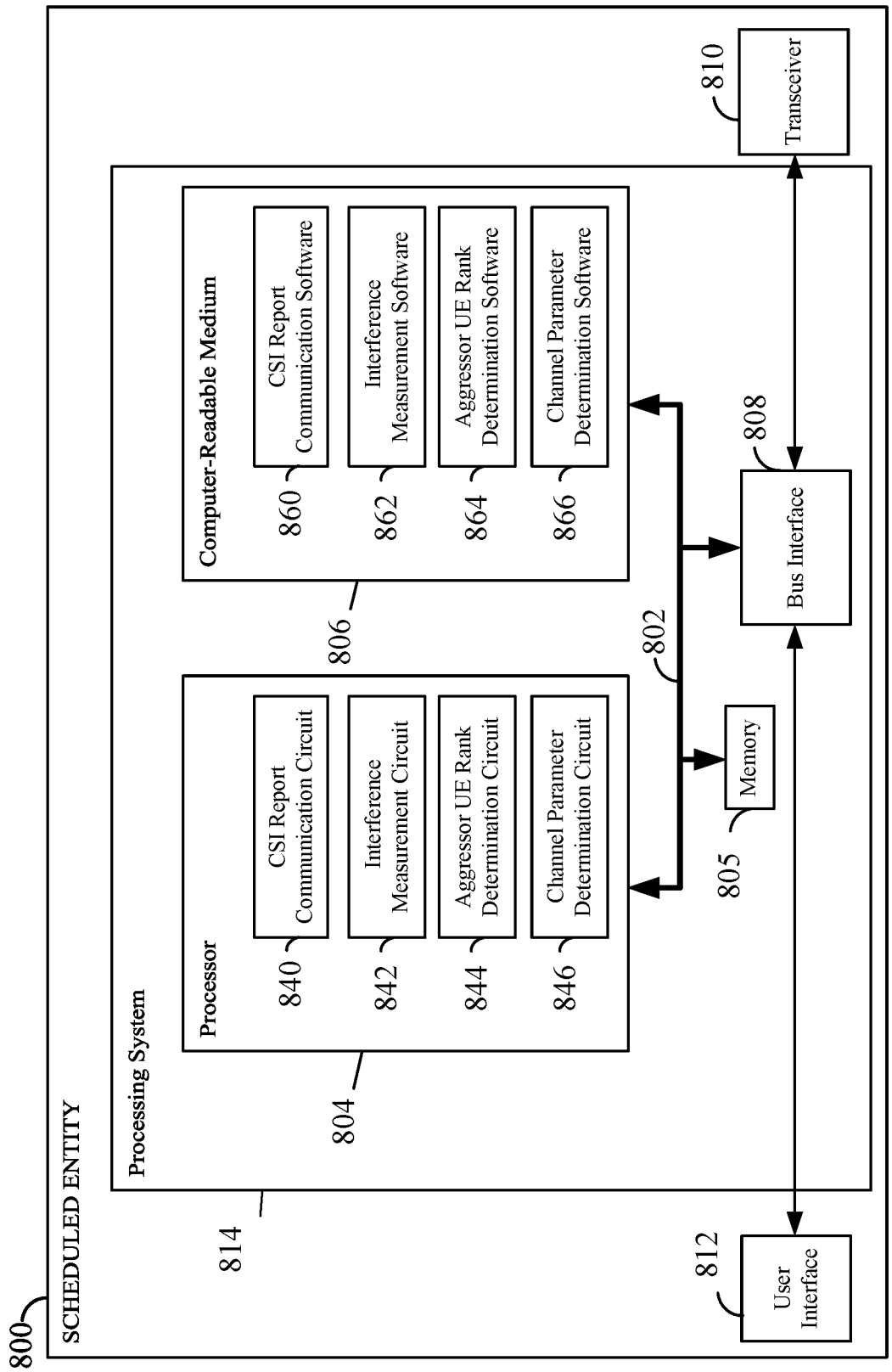
FIG. 8 is a block diagram conceptually illustrating an example of a hardware implementation for a scheduled entity according to some aspects of the disclosure.

FIG. 8 is a conceptual diagram illustrating an example of a hardware implementation for an exemplary scheduled entity 800 employing a processing system 814. In accordance with various aspects of the disclosure, an element, or any portion of an element, or any combination of elements may be implemented with a processing system 814 that includes one or more processors 804. For example, the scheduled entity 800 may be a user equipment (UE) as illustrated in any one or more of FIGS. 1, 2, 3, 5, and/or 6. And in some examples, the scheduled entity 800 may be an IAB node as illustrated in any one or more of FIGS. 5 and/or 6.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may include CSI report communication circuitry 840 configured for various functions, including, e.g., receiving CSI report configuration information including an indication of a maximum rank of an aggressor UE's UL transmission, and/or transmitting a CSI report including an indication of at least one rank value for the aggressor UE, and in some examples, an indication of one or more channel parameters corresponding to the rank value. For example, the CSI report communication circuitry 840 may be configured to implement one or more of the functions described below in relation to FIG. 9, including, e.g., blocks 902 and/or 908. The processor 804 may further include interference measurement circuitry 842 configured for various functions, including, e.g., performing an interference measurement of a signal (e.g., an SRS) received from an aggressor UE. For example, the interference measurement circuitry 842 may be configured to implement one or more of the functions described below in relation to FIG. 9, including, e.g., block 906. The processor 804 may further include aggressor UE rank determination circuitry 844 configured for various functions, including, e.g., determining one or more rank values for each of one or more aggressor UEs based on an interference measurement. For example, the aggressor UE rank determination circuitry 844 may be configured to implement one or more of the functions described below in relation to FIG. 9, including, e.g., block 906. The processor 804 may further include channel parameter determination circuitry 846 configured for various functions, including, e.g., determining one or more channel parameters for a DL channel (e.g., a throughput, a RI, a PMI, and/or a CQI), corresponding to respective rank values for an interfering UL channel. For example, the channel parameter determination circuitry 846 may be configured to implement one or more of the functions described below in relation to FIG. 9, including, e.g., block 906.

Further, the computer-readable storage medium 806 may include CSI report communication software 860 configured for various functions, including, e.g., receiving CSI report configuration information including an indication of a maximum rank of an aggressor UE's UL transmission, and/or transmitting a CSI report including an indication of at least one rank value for the aggressor UE, and in some examples, an indication of one or more channel parameters corresponding to the rank value. For example, the CSI report communication software 860 may be configured to implement one or more of the functions described below in relation to FIG. 9, including, e.g., blocks 902 and/or 908. The computer-readable storage medium 806 may further include interference measurement software 862 configured for various functions, including, e.g., performing an interference measurement of a signal (e.g., an SRS) received from an aggressor UE. For example, the interference measurement software 862 may be configured to implement one or more of the functions described below in relation to FIG. 9, including, e.g., block 906. The computer-readable storage medium 806 may further include aggressor UE rank determination software 864 configured for various functions, including, e.g., determining one or more rank values for each of one or more aggressor UEs based on an interference measurement. For example, the aggressor UE rank determination software 864 may be configured to implement one or more of the functions described below in relation to FIG. 9, including, e.g., block 906. The computer-readable storage medium 806 may further include channel parameter determination software 866 configured for various functions, including, e.g., determining one or more channel parameters for a DL channel (e.g., a throughput, a RI, a PMI, and/or a CQI), corresponding to respective rank values for an interfering UL channel. For example, the channel parameter determination software 866 may be configured to implement one or more of the functions described below in relation to FIG. 9, including, e.g., block 906.

In one configuration, the scheduling entity or base station 800 configured for wireless communication includes means for means for transmitting channel state information (CSI) report configuration information to a victim user equipment (UE), including an indication of a maximum rank of an aggressor UE's uplink transmission; means for receiving a CSI report from the victim UE, including an indication of at least one rank value for the aggressor UE; and means for determining a rank for an uplink resource assignment for the aggressor UE based on the at least one rank value. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 3, 5, 6, and/or 8, and utilizing, for example, the processes and/or algorithms described herein in relation to FIG. 9.

FIG. 9 is a flow chart illustrating an exemplary process 900 for interference handling in a network configured for full duplex in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduling entity 700 illustrated in FIG. 7. In some examples, the process 900 may be carried out by any suitable apparatus or means for carrying out the functions or algorithm described below.

At block 902, a base station configured for full duplex may transmit to a DL UE an indication of a maximum rank of an aggressor UE. The base station may obtain this information from the identified UL UE via any suitable signaling between the UL UE and the base station.

The maximum rank of the aggressor UE's UL transmission depends on which UE is the aggressor UE paired in full duplex. That is, the maximum rank is not larger than a maximum rank of an UL data channel of the identified UL UE (i.e., the aggressor UE) in full duplex. Furthermore, different UL UEs may transmit different maximum numbers of UL data channel layers, depending, e.g., on their respective capabilities, the UL channel status used by the respective UEs, and/or their respective UL data buffer status. Here, an UL UE that is utilizing a weak UL channel or has a low UL data buffer generally leads to a small number of UL data channel layers.

The base station's indication of the maximum rank of the aggressor UE's interfering UL transmission may, for example, be an information element that explicitly provides the maximum rank value. In another example, the indication of the maximum rank may be an information element that provides the number of quantization bits that a victim UE will use to represent the rank of the aggressor UE's interfering UL transmission, in the victim UE's report to the base station.

In a further aspect of this disclosure, the base station may further transmit to the victim UE information indicating resource usage of the aggressor UE for its SRS transmission. While the aggressor UE SRS resource usage information may accompany the maximum rank information in a single transmission or channel, this is not necessarily the case, and in some examples these data may be transmitted separately utilizing any suitable transmission format or scheme.

The base station may provide the indication of the maximum rank to the victim UE utilizing any suitable channel or signaling, including but not limited to RRC signaling, a MAC CE, DCI, or some combination of the above. In some examples, the base station may transmit the indication of the aggressor UE's maximum rank together with an indication of the aggressor UE's resource usage for its SRS transmissions in a CSI report configuration message.

For example, a base station that provides the indication of the maximum rank via RRC signaling can include the indication in an RRC message that configures the victim UE's CSI reports. In various examples, such an RRC message may configure any suitable kind of CSI report, such as a periodic CSI report, a semi-persistent CSI report, an aperiodic CSI report, etc. In another example, a base station that provides the indication of the maximum rank via a MAC CE may provide the indication in a MAC CE that configures a semi-persistent CSI report by the victim UE. Here, a semi-persistent CSI report may be a configuration for CSI reports that lasts for a duration of multiple slots. In another example, a base station that provides the indication of the maximum rank via DCI may provide the indication in DCI that configures an aperiodic CSI report by the victim UE.

In some examples, where a cell is further configured for MU-MIMO, multiple UEs may make UL MU-MIMO transmissions together. Thus, each of these multiple UEs may become an aggressor UE to a DL UE receiving a DL in full duplex. Accordingly, in a further aspect of this disclosure, at block 902 a base station configured for MU-MIMO may transmit to a victim UE a plurality of maximum ranks, each corresponding to a different respective identified UL UE's interfering UL transmission.

At block 904, the victim UE may receive one or more SRS signals at resources allocated to the selected UL UE (i.e., the aggressor UE) for its transmission of SRS signals. In some examples, an aggressor UE may transmit a plurality of SRSs. In these examples, a victim UE may select any suitable one or more of the SRSs from the aggressor UE for its determination of the rank of the aggressor UE's interfering UL transmission, and a corresponding CSI. Here, the victim UE may follow a preconfigured order or selection algorithm to select the SRS or SRSs it receives. For example, if a selected inter-UE interference rank equals one (1), the victim UE may select the SRS signal that the aggressor UE transmits in the first SRS resource block or port as inter-UE interference. Here, the first SRS resource block or port may be the SRS resource block or port whose index is the smallest among the aggressor UE's resources allocated for SRS transmission. In another example, if a selected inter-UE interference rank equals two (2), the victim UE may select the SRS signals that the aggressor UE transmits in the first and second SRS resource blocks or ports as inter-UE interference. Here, once again, the first and second SRS resource blocks or ports may be the SRS resource blocks or ports whose indexes are the smallest among the aggressor UE's resources allocated for SRS transmission.

In some examples, a base station may configure an UL UE (i.e., the aggressor UE) to transmit SRS with the strongest available beamforming gain, from the base station's point of view, at the first SRS resource block or port, and to transmit SRS with the second strongest available beamforming gain at the second SRS resource block or port.

In various examples, an aggressor UE's SRS usage may be codebook or non-codebook. This refers to the aggressor UE transmitting its SRS in a codebook-based PUSCH or a non-codebook-based PUSCH, respectively. That is, a given UE's UL transmission mode or scheme may be, for example, codebook based or non-codebook based. Here, different UL transmission modes or schemes utilize different precoding matrices for processing their PUSCH transmissions. Thus, an aggressor UE's SRS transmission may utilize different precoding matrices based on whether its SRS usage is codebook or non-codebook. In an aspect of this disclosure, in an example where the aggressor UE's SRS usage is non-codebook, the victim UE may select the SRS resources that it receives from among the multiple SRS resources the aggressor UE uses for SRS. And in an example where the aggressor UE's SRS usage is codebook, the victim UE may select one SRS resource and the SRS ports that it receives from among the multiple ports of this SRS resource the aggressor UE uses for SRS.

At block 906, the victim UE may determine one or more interfering UL transmission rank values, and for each of the one or more rank values, the victim UE may determine one or more corresponding channel parameters for DL channel from the base station to the victim UE. The victim UE may determine the rank values and channel parameters based on the SRS(s) received from the aggressor UE. Here, the one or more channel parameters may be CSI values for transmission in a CSI report.

For example, the victim UE may calculate one or more interference matrices (e.g., subband interference matrices or wideband interference matrices) whose each element represents the interference strength from one aggressor UE's antenna or port to one victim UE's antenna or port, based on the one or more SRSs received from the aggressor UE. Here, the victim UE may calculate a different interference matrix for each of a plurality of interference rank values, up to and including all possible interference rank values up to the maximum rank of the aggressor UE's interfering UL transmission. The victim UE may then determine corresponding channel parameters (e.g., CSI values) based on the interference matrix of each interference rank value. For example, the victim UE may select the channel parameters corresponding to a given rank value such that a projected throughput of a DL channel received from the base station is maximized when the aggressor is configured to transmit its interfering UL transmission utilizing the corresponding rank. In another example, the victim UE may determine a rank indicator (RI) and precoding matrix indicator (PMI) for a DL data channel from the base station to the victim UE, which are projected to achieve the highest receive SINR and/or the highest CQI when the inter-UE interference from the aggressor UE uses the selected interference rank value. The victim UE may include these RI and PMI values in the CSI report. In some examples, when a victim UE determines the CSI values corresponding to an interference rank, the victim UE may assume that the total transmit power of the aggressor UE is evenly distributed in all the interference layers.

At block 908, the victim UE may transmit a CSI report to a base station, containing the inter-UE interference rank value(s) and corresponding CSI(s) determined in block 906. Here, the inter-UE interference rank may take a value corresponding to a positive integer (e.g., 1, 2, . . . ). Here, if the maximum value of the inter-UE interference rank is N, then the inter-UE interference rank may be quantized utilizing $[\log_2 N]$ bits.

In an example where the victim UE transmits multiple inter-UE interference ranks and their corresponding CSI values, the victim UE may transmit those multiple sets of data within one or multiple CSI report messages.

At block 910, a base station may select a rank for the UL UE, based on the one or more inter-UE interference rank values received from the DL UE. For example, if the victim UE transmitted one (1) inter-UE interference rank value to the base station, then the base station may select that interference rank value. And if the victim UE transmitted two (2) or more inter-UE interference rank values to the base station, then the base station may select one of the rank values from among the received rank values. Here, the base station may base its selection of a rank value on its corresponding CSI values received from the victim UE in the CSI report described above in connection with block 908. The base station may further base its selection of a rank value on a known relationship between UL performance and a number of UL spatial multiplex layers. For example, a higher number of UL spatial multiplex layers generally leads to better UL performance (e.g., higher spectrum efficiency) and a poorer DL performance (e.g., smaller CQI values).

Accordingly, by selecting a suitable rank for the UL UE, taking into consideration the CSI report values received from the victim UE in connection with each rank, the base station may achieve a preferred balance between the UL performance of the UL UE and the DL performance of the DL UE. For example, the base station may select a rank for the UL UE based on the inter-UE interference rank values received from the victim UE, and may select a transport format (e.g., including a rank) for the DL UE based on the corresponding CSI report values received from the victim UE, such that the selected values can achieve the largest DL-plus-UL throughput. In another example, the base station may select a rank for the UL UE, and a transport format for the DL UE, which can maintain a given DL over UL throughput ratio. Any other suitable joint consideration between respective UL and DL performance may further be performed within the scope of this disclosure.

As discussed above in relation to block 902, in some examples, a base station may further be configured for MU-MIMO. And thus, a victim UE may be configured with multiple maximum rank values corresponding to the respective UL UEs. In such an example, at block 904, a victim UE may receive SRS resource(s) from a plurality of identified UL UEs. And at block 906, the victim UE may determine a rank value for each of the plurality of identified UL UEs. In a further aspect of the disclosure, the victim UE may select a CSI for transmission in a CSI report based on the combined inter-UE interference from the selected simultaneously-transmitting UL MU-MIMO UEs. At block 908, the victim UE may transmit a CSI report to the base station, containing the plurality of determined rank values, corresponding to the selected UL UEs, and the selected CSI. And at block 910, the base station may choose to utilize the victim UE's reported rank values for the simultaneously-transmitting UL MU-MIMO UEs, and the reported CSI for determining a transport format for a DL to the victim UE.

At block 912, the base station may transmit an UL resource allocation to the UL (aggressor) UE(s), including the selected rank for the UL UE(s); and at block 914, the base station may transmit a DL resource allocation to the DL (victim) UE, including the selected transport format for the DL UE.

By utilizing a procedure in accordance with these disclosures, a network configured for full duplex can take advantage of the ability of a victim UE to directly characterize inter-UE interference, in order to jointly determine an UL and DL transport format that achieves, for example, the largest DL-plus-UL throughput.

Further Examples Having a Variety of Features

Example 1: A method, apparatus, and non-transitory computer-readable medium for interference handling is disclosed. Here, a UE may receive channel state information (CSI) report configuration information, including an indication of a maximum rank of an aggressor UE's uplink transmission. The UE may perform an interference measurement of a signal received from an aggressor UE and determine one or more rank values for the aggressor UE, less than or equal to the maximum rank, based on the interference measurement. The UE may then transmit a CSI report comprising an indication of at least one rank value of the one or more rank values for the aggressor UE.

Example 2: A method, apparatus, and non-transitory computer-readable medium of Example 1, where the UE may further determine one or more channel parameters for a downlink channel, the one or more channel parameters corresponding to respective ones of the one or more rank values. Here, the CSI report may further include an indication of the one or more channel parameters.

Example 3: A method, apparatus, and non-transitory computer-readable medium of any of Examples 1 to 2, where the UE may further determine the one or more channel parameters corresponding to a first rank value of the one or more rank values, based on a projected throughput of the downlink channel when received using the same resources as the aggressor UE's uplink transmission, configured with the first rank value, in a network configured for full duplex.

Example 4: A method, apparatus, and non-transitory computer-readable medium of any of Examples 1 to 3, where the one or more channel parameters include a rank indicator (RI), a precoding matrix indicator (PMI), and a channel quality indicator (CQI). Here, the UE may further determine the RI and PMI corresponding to a first rank value of the one or more rank values, based on one or more of a signal-to-interference-and-noise ratio (SINR) or the CQI, projected to be achieved for a downlink transmission configured based on the RI and PMI, when the downlink transmission is received while the aggressor UE transmits an uplink transmission configured with the first rank value, in a network configured for full duplex.

Example 5: A method, apparatus, and non-transitory computer-readable medium of any of Examples 1 to 4, where the UE may further receive one or more sounding reference signals (SRS) from the aggressor UE. Here, the UE's interference measurement includes characterizing the one or more SRSs received from the aggressor UE.

Example 6: A method, apparatus, and non-transitory computer-readable medium of any of Examples 1 to 5, where the UE is a victim UE. Here, the victim UE is configured to receive the downlink channel using the same resources as the aggressor UE's uplink transmission in a network configured for full duplex.

Example 7: A further method, apparatus, and non-transitory computer-readable medium for interference handling is disclosed. In this example, a scheduling entity (e.g., a base station or gNB) transmits channel state information (CSI) report configuration information to a victim user equipment (UE), including an indication of a maximum rank of an aggressor UE's uplink transmission. The scheduling entity may further receive a CSI report from the victim UE, including an indication of at least one rank value for the aggressor UE, and determine a rank for an uplink resource assignment for the aggressor UE based on the at least one rank value.

Example 8: A method, apparatus, and non-transitory computer-readable medium of any of Example 7, where the received CSI report further includes a set of one or more channel parameters, corresponding to each respective rank value of the at least one rank value. Here, the scheduling entity further determines a transport format for a downlink resource assignment for the victim UE based on the set of one or more channel parameters.

Example 9: A method, apparatus, and non-transitory computer-readable medium of any of Examples 7 to 8, where the downlink resource assignment for the victim UE corresponds to the same radio resources as the uplink resource assignment for the aggressor UE. In this example, the scheduling entity may further jointly determine the transport format for the downlink resource assignment for the victim UE, and the rank for the uplink resource assignment for the aggressor UE, based on a projected combined throughput when the aggressor UE transmits an uplink configured based on the rank, and the victim UE receives a downlink configured based on the transport format.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method operable at a user equipment (UE), for interference handling in a wireless communication system, the method comprising:
   receiving channel state information (CSI) report configuration information, comprising an indication of a maximum rank of an aggressor UE's uplink transmission;
   performing an interference measurement of a signal received from the aggressor UE;
   determining one or more rank values for the aggressor UE, less than or equal to the maximum rank, based on the interference measurement; and
   transmitting a CSI report comprising an indication of at least one rank value of the one or more rank values for the aggressor UE.

2. The method of claim 1, further comprising:
   determining one or more channel parameters for a downlink channel, the one or more channel parameters corresponding to respective ones of the one or more rank values,
   wherein the CSI report further comprises an indication of the one or more channel parameters.

3. The method of claim 2, further comprising determining the one or more channel parameters corresponding to a first rank value of the one or more rank values, based on a projected throughput of the downlink channel when received using the same resources as the aggressor UE's uplink transmission, configured with the first rank value, in a network configured for full duplex.

4. The method of claim 2, wherein the one or more channel parameters comprise a rank indicator (RI), a precoding matrix indicator (PMI), and a channel quality indicator (CQI),
   the method further comprising determining the RI and PMI corresponding to a first rank value of the one or more rank values, based on one or more of a signal-to-interference-and-noise ratio (SINR) or the CQI, projected to be achieved for a downlink transmission configured based on the RI and PMI, when the downlink transmission is received while the aggressor UE transmits an uplink transmission configured with the first rank value, in a network configured for full duplex.

5. The method of claim 1, further comprising receiving one or more sounding reference signals (SRS) from the aggressor UE,
- wherein performing the interference measurement comprises characterizing the one or more SRSs received from the aggressor UE.

6. The method of claim 1, wherein the method is operable at a victim UE, and wherein the victim UE is configured to receive the downlink channel using the same resources as the aggressor UE's uplink transmission in a network configured for full duplex.

7. A method operable at a scheduling entity, for interference handling in a wireless communication system, the method comprising:
- transmitting channel state information (CSI) report configuration information to a victim user equipment (UE), comprising an indication of a maximum rank of an aggressor UE's uplink transmission;
- receiving a CSI report from the victim UE, comprising an indication of at least one rank value for the aggressor UE based on the aggressor UE's uplink transmission, wherein the received CSI report further comprises a set of one or more channel parameters, corresponding to each respective rank value of the at least one rank value;
- determining a rank for an uplink resource assignment for the aggressor UE based on the at least one rank value;
- determining a transport format for a downlink resource assignment for the victim UE based on the set of one or more channel parameters; AND
- transmitting an UL allocation including the determined rank to the aggressor UE, and a DL resource allocation including the determined transport format to the victim UE.

8. The method of claim 1, wherein the downlink resource assignment for the victim UE corresponds to the same radio resources as the uplink resource assignment for the aggressor UE,
- the method further comprising jointly determining the transport format for the downlink resource assignment for the victim UE, and the rank for the uplink resource assignment for the aggressor UE, based on a projected combined throughput when the aggressor UE transmits an uplink configured based on the rank, and the victim UE receives a downlink configured based on the transport format.

9. User equipment (UE) for wireless communication, comprising:
- a processor;
- a transceiver communicatively coupled to the processor; and
- a memory communicatively coupled to the processor,
- wherein the processor and the memory are configured to:
  - receive channel state information (CSI) report configuration information, comprising an indication of a maximum rank of an aggressor UE's uplink transmission;
  - perform an interference measurement of a signal received from the aggressor UE;
  - determine one or more rank values for the aggressor UE, less than or equal to the maximum rank, based on the interference measurement; and
  - transmit a CSI report comprising an indication of at least one rank value of the one or more rank values for the aggressor UE.

10. The UE of claim 9, wherein the processor and the memory are further configured to determine one or more channel parameters for a downlink channel, the one or more channel parameters corresponding to respective ones of the one or more rank values,
- wherein the CSI report further comprises an indication of the one or more channel parameters.

11. The UE of claim 10, wherein the processor and the memory are further configured to determine the one or more channel parameters corresponding to a first rank value of the one or more rank values, based on a projected throughput of the downlink channel when received using the same resources as the aggressor UE's uplink transmission, configured with the first rank value, in a network configured for full duplex.

12. The UE of claim 10, wherein the one or more channel parameters comprise a rank indicator (RI), a precoding matrix indicator (PMI), and a channel quality indicator (CQI),
- wherein the processor and the memory are further configured to determine the RI and PMI corresponding to a first rank value of the one or more rank values, based on one or more of a signal-to-interference-and-noise ratio (SINR) or the CQI, projected to be achieved for a downlink transmission configured based on the RI and PMI, when the downlink transmission is received while the aggressor UE transmits an uplink transmission configured with the first rank value, in a network configured for full duplex.

13. The UE of claim 9, wherein the processor and the memory are further configured to receive one or more sounding reference signals (SRS) from the aggressor UE,
- wherein performing the interference measurement comprises characterizing the one or more SRSs received from the aggressor UE.

14. The UE of claim 9, wherein the UE is a victim UE, and wherein the processor and the memory are further configured to receive the downlink channel using the same resources as the aggressor UE's uplink transmission in a network configured for full duplex.

15. A scheduling entity for wireless communication, comprising:
- a processor;
- a transceiver communicatively coupled to the processor; and
- a memory communicatively coupled to the processor, wherein the processor and the memory are configured to:
- transmit channel state information (CSI) report configuration information to a victim user equipment (UE), comprising an indication of a maximum rank of an aggressor UE's uplink transmission;
- receive a CSI report from the victim UE, comprising an indication of at least one rank value for the aggressor UE based on the aggressor UE's uplink transmission, wherein the received CSI report further comprises a set of one or more channel parameters, corresponding to each respective rank value of the at least one rank value;
- determine a rank for an uplink resource assignment for the aggressor UE based on the at least one rank value;
- determine a transport format for a downlink resource assignment for the victim UE based on the set of one or more channel parameters; AND
- transmit an UL allocation including the determined rank to the aggressor UE, and a DL resource allocation including the determined transport format to the victim UE.

16. The scheduling entity of claim 15, wherein the downlink resource assignment for the victim UE corresponds to the same radio resources as the uplink resource assignment for the aggressor UE, wherein the processor and the memory are further configured to jointly determine the transport format for the downlink resource assignment for the victim UE, and the rank for the uplink resource assignment for the aggressor UE, based on a projected combined throughput when the aggressor UE transmits an uplink configured based on the rank, and the victim UE receives a downlink configured based on the transport format.

* * * * *